United States Patent Office.

RICHARD PATTIN, OF HARMAR, OHIO, ASSIGNOR TO THE ARGAND REFINING COMPANY, OF MARIETTA, OHIO.

COMPOUND FROM WHICH CAN BE MADE A LUBRICATING-OIL OF LOW COLD TEST.

SPECIFICATION forming part of Letters Patent No. 318,389, dated May 19, 1885.

Application filed December 31, 1884. (No specimens.)

*To all whom it may concern:*

Be it known that I, RICHARD PATTIN, of Harmar, in the county of Washington and State of Ohio, have invented a new composition of matter from which can be made a lubricating-oil of zero and below cold test, and have also invented the manner and process of compounding and using a new composition of matter from which can be made a lubricating-oil of zero and below cold test; and I do hereby declare that the following is a full and exact description thereof.

The nature of my invention consists in mixing, in certain proportions hereinafter named, residuum, as made by an ordinary refinery for making carbon oil for burning purposes from petroleum, with benzine, and agitating the same thoroughly together in a tank, and then mixing the same with sulphuric acid and again stirring and agitating the same in a tank and allowing it to settle. The result is a compound from which can be made, by mixing the same with crude petroleum and stilling it in the ordinary way, a lubricating-oil of zero and below cold test.

To enable others skilled in the art to make and use my invention, I will proceed to describe its construction and operation.

I take from eight to forty parts residuum, as made by an ordinary refinery for making carbon oil for burning purposes from petroleum by the ordinary process, and mixing with from sixteen to sixty parts of benzine in a tank, and then thoroughly stir and agitate the same until the two are thoroughly mixed, after which I put therein from one to two parts of sulphuric acid, and again mix and stir that compound thoroughly and allow it to settle for from twelve to twenty-four hours, and the result is a compound from which can be made, by mixing with crude petroleum-oil and stilling in the ordinary way, a zero and below cold-test oil.

From this composition can be made, by mixing it with crude petroleum-oil and stilling it in the ordinary way, a lubricating-oil of superior quality which will not congeal when subjected to zero and below exposure of cold.

What I claim as my invention, and desire to secure by Letters Patent, is—

1. The process of making a compound from which can be made a zero and below cold-test oil by mixing therewith crude petroleum and stilling in the ordinary way, said process of making said compound consisting of mixing residuum from an ordinary oil-refinery of carbon illuminating-oil in the proportions hereinbefore named with benzine in the proportions above named and agitating and stirring thoroughly, and then mixing with it sulphuric acid in the proportions above named and agitating and stirring thoroughly, and allowing the same to settle for from twelve to twenty-four hours.

2. The composition itself, which is formed or made by the process of mixing from eight to forty parts of residuum from an ordinary coal-oil refinery for making carbon oil for illuminating purposes by the ordinary method with from sixteen to sixty parts of benzine and stirring and agitating the same till thoroughly mixed, and then putting therein from one to two parts of sulphuric acid and agitating again till thoroughly mixed, and allowing the same to settle for from twelve to twenty-four hours.

RICHARD PATTIN.

In presence of—
F. B. WILLIAMSON,
THOS. EWART.